(12) United States Patent
Madhavan et al.

(10) Patent No.: US 8,893,517 B2
(45) Date of Patent: Nov. 25, 2014

(54) VEHICLE AIR HANDLING SYSTEM

(75) Inventors: Ranganathan Madhavan, Canton, MI (US); Curtis M. Jones, Wixom, MI (US); Manfred Koberstein, Troy, MI (US); Kenneth G. Brown, Shelby Township, MI (US); Eric G. Schaefer, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 239 days.

(21) Appl. No.: 13/595,269

(22) Filed: Aug. 27, 2012

(65) Prior Publication Data

US 2014/0053590 A1    Feb. 27, 2014

(51) Int. Cl.
*F25D 3/12* (2006.01)

(52) U.S. Cl.
USPC .................................................. 62/56; 62/244

(58) Field of Classification Search
CPC ............... F24F 11/02; B60H 1/00371; B60H 2001/00235; B60D 27/0081; B60D 13/06; F25D 3/06
USPC ............................. 62/244, 129, 157, 241, 56
See application file for complete search history.

(56) References Cited

U.S. PATENT DOCUMENTS

| | | | |
|---|---|---|---|
| 5,749,236 A | 5/1998 | Tavian et al. | |
| 6,595,847 B1 * | 7/2003 | Freese et al. | 454/118 |
| 2008/0034767 A1 * | 2/2008 | Ziehr et al. | 62/180 |
| 2008/0245504 A1 | 10/2008 | Eisenhour | |
| 2009/0321533 A1 * | 12/2009 | Bigler et al. | 237/12.3 B |
| 2010/0050671 A1 * | 3/2010 | Kahn et al. | 62/190 |
| 2010/0163220 A1 * | 7/2010 | Nakajima | 165/202 |
| 2011/0067389 A1 * | 3/2011 | Prior et al. | 60/320 |
| 2011/0132007 A1 * | 6/2011 | Weyna et al. | 62/115 |
| 2011/0308763 A1 * | 12/2011 | Charnesky et al. | 165/41 |
| 2012/0009859 A1 | 1/2012 | Wijaya et al. | |

* cited by examiner

*Primary Examiner* — Mohammad M Ali
(74) *Attorney, Agent, or Firm* — Vichit Chea; MacMillan, Sobanski & Todd, LLC

(57) ABSTRACT

A vehicle air handling system includes an air conditioner having an inlet selectively opening to a source of fresh air or recirculated air from within the passenger compartment. A controller switches the source of inlet air to recirculated air under certain conditions in order to optimize system efficiency and component life.

18 Claims, 3 Drawing Sheets

VEHICLE AIR HANDLING SYSTEM

TECHNICAL FIELD

The present invention relates generally to vehicle air handling systems, and more particularly to the use of recirculated air in such systems.

BACKGROUND OF THE INVENTION

Automotive vehicle cabin comfort is maintained by air conditioning systems which provide for heating, cooling and ventilation of cabin air. These systems are commonly referred to as HVAC systems. Originally, vehicle HVAC systems relied upon fresh air from outside of the passenger compartment for heating, cooling and ventilation. As conditioning systems developed, a recirculation mode was introduced to increase efficiencies. Accordingly, typical automotive vehicle HVAC systems have two air handling operating modes: a fresh air mode and a recirculation air mode.

Vehicle operators and passengers often select the air inlet mode of the conditioner without considering optimum performance of the system, including strain placed on vehicle components. For example, if the fresh air mode is selected as the source of air for the HVAC system in hot weather, the system compressor will experience a higher load. This can result in a high compressor discharge temperature and pressure that can lead to compressor or clutch damage or damage to other refrigerant components. In addition, engine coolant temperatures as well as engine and transmission oil temperatures can exceed recommended levels, which can degrade powertrain performance. On the other hand, there are factors that disfavor use of the recirculation mode under certain circumstances. For example, use of the recirculation mode under certain ambient conditions may cause cabin fogging.

It would be desirable to have an HVAC system in which the recirculation mode of a vehicle HVAC system is automatically selected under certain conditions to optimize cabin comfort and vehicle component life.

SUMMARY OF THE INVENTION

The present invention is a vehicle air handling system having an air inlet that can receive fresh air from outside of the passenger compartment. Alternatively, the system may direct the air inlet to receive air from within the passenger compartment to be recirculated. The system includes a controller for selecting the source of inlet air. The controller utilizes a control strategy for selecting the recirculation mode to optimize vehicle passenger comfort and system life.

The system includes various sensors to provide input to the controller for determining whether to direct the system to use recirculated air. For example, sensors may provide input to the controller to determine engine oil temperature, transmission oil temperature, engine speed, accelerator pedal position, evaporator temperature, head pressure, compressor current, etc. The present invention facilitates optimization of the air handling system.

DETAILED DESCRIPTION OF A PREFERRED EMBODIMENT

Control of air temperature, air flow and humidity within an automobile is achieved using various air flow regulating devices such as air distribution mode doors, and temperature blend doors operated by several actuators as is well known in the art. The actuators may include electric motors, vacuum or hydraulic controllers, etc.

Figure 1:
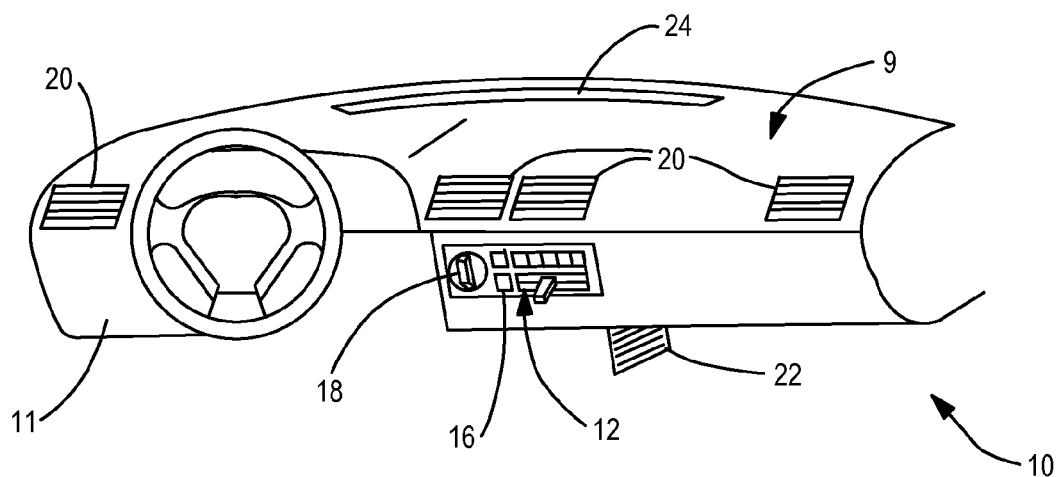
FIG. 1 is a perspective view of a portion of a passenger compartment of a vehicle having an air handling system of the present invention.

FIG. 1 shows a portion of a vehicle passenger compartment 10 having a heating, ventilation and air conditioning (HVAC) system 9. The system 9 includes typical heating and cooling elements such as a heater core, an evaporator core, a fixed or variable displacement compressor, a condenser, a refrigerant tank, ducting, etc. The vehicle dashboard 11 includes HVAC controls 12, including a cabin temperature control lever 14 that controls the temperature or blend door position to select a desired temperature. The controls 12 also include an air recirculating mode button 16, and an air distribution mode knob 18. The air distribution mode knob 18 is be used to select the HVAC cabin outlet, for example, from the panel outlets 20, floor outlets 22 or windshield defroster outlets 24, or a combination thereof.

Figure 2:
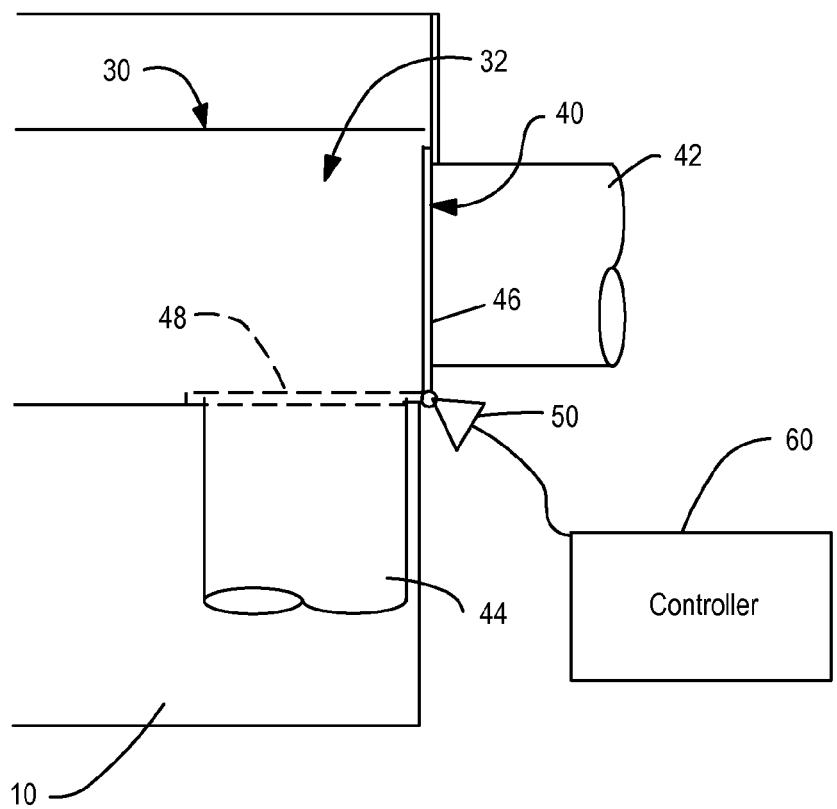
FIG. 2 is a schematic view of a portion of the air handling system of the present invention.

FIG. 2 shows schematically the inlet portion 30 of the HVAC system 9. The system 9 has an inlet 32 which may receive fresh air from outside of the passenger compartment 10 or recirculated air from within the passenger compartment 10. An inlet door 40 selectively allows inlet air to the system 9 from a fresh air inlet 42 or a recirculation air inlet 44. The fresh air inlet 42 is in communication with air outside of the passenger compartment 10 while the recirculation air inlet 44 is in communication with the passenger compartment 10. The inlet door is operable by an electric servo motor 50. Of course, the door 40 may be operable by many other types of actuators such as vacuum, hydraulic, etc. as is well known in the art. While a single inlet door 40 is illustrated, multiple inlet doors such as 40 may be used within the scope of the present invention.

The inlet door 40 shown in FIG. 2 in the recirculation mode position 46 in which the door 40 is blocking the fresh air inlet 42 and allowing communication between the passenger compartment 10 through the passenger compartment inlet 44 to the conditioner inlet 32. The inlet door 40 is movable between the recirculation mode position 46 to a fresh air position 48 shown in phantom in FIG. 2. In the fresh air position 48, the door 40 blocks the recirculation inlet 44 and allows communication with outside air through the outside air inlet 42 to the conditioner inlet 32. Of course, the door 40 may be positioned intermediate the fresh air and recirculation air modes.

The servo motor 50 which operates the inlet door 40 is controlled by an electronic controller 60. The default position of the inlet door 40 is the fresh air mode position 48. If a vehicle occupant manually selects the recirculation mode using the recirculation button 16, the controller 60 receives instructions to move the inlet door 40 to the recirculation mode position 46 and causes the servo motor to move the inlet door 40 to position 46. The controller 60 includes override strategy software which allows the controller 60 to generate signals in to control the motor 50 and actuators which move the inlet door 40 from the fresh air mode position 48 to the recirculation mode position 46 under certain conditions as will be explained.

Figure 3:
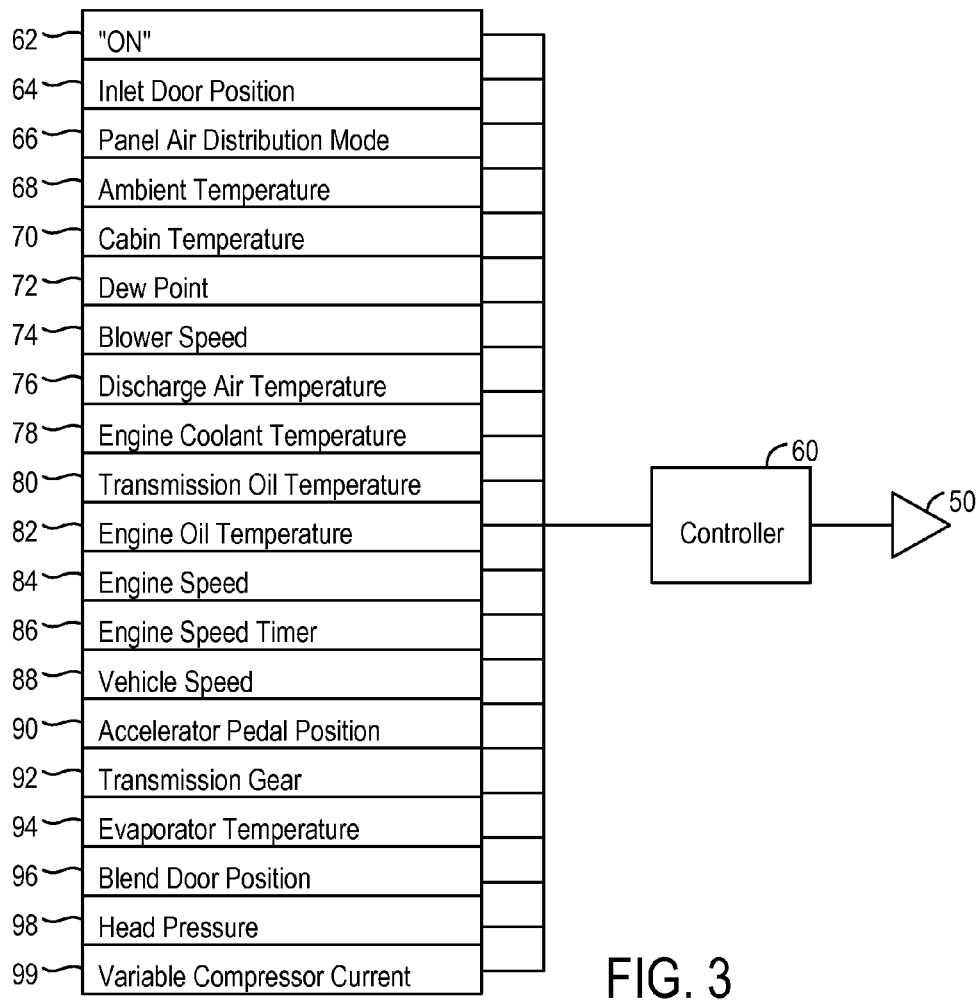
FIG. 3 is a schematic showing various sensors which may be used with the present invention.

Referring to FIG. 3, the conditioning system 9 includes various sensors that sense the condition or characteristics of vehicle components, vehicle systems, or vehicle surroundings. The sensors provide input to the controller 60 in the form of signals that are representative of the various conditions or characteristics. For example, a voltage or current signal may be provided to the controller representative of a motor speed. When input of a condition or characteristic to the controller 60 is referenced herein, it should be understood that the input may be in the form of a signal representative of the condition of characteristic.

The controller 60 determines whether input from the various sensors meets certain predetermined conditions. Predetermined conditions include sensor input within a predetermined range. Predetermined ranges may include a range at or below a predetermined level. Predetermined ranges and levels referenced herein are determined by considering various factors, such as vehicle size and weight, engine size, final drive ratio, likely road conditions, such as flat or graded, likely climate ambient air temperatures, the engine cooling system, the likely load on the refrigerant system, etc.

The sensors include a system "on" sensor 62 that determines whether the system 9 is activated or "on." The sensor 62 provides a signal to the controller 60 when the system 9 is activated.

An inlet door position sensor 64 provides signals to the controller 60 relating to whether the inlet door 40 is in the fresh air position 48. A panel distribution mode sensor 66 provides signals to the controller 60 relating to whether any of the panel outlets 20 are being utilized. This can be done by determining whether the air distribution mode control 18 is in any panel mode position.

An ambient air temperature sensor 68 measures the ambient air temperature outside of the vehicle and provides ambient air temperature signals to the controller 60. The controller 60 determines whether the ambient air temperature is above a predetermined level.

The controller 60 also determines whether the probability of using recirculating air from within the passenger compartment will create a fog in the passenger compartment. The controller 60 may use one or more of various factors to make the determination, such as, for example, passenger compartment or cabin temperature, ambient air dew point or humidity, HVAC blower speed, HVAC discharge air temperature, etc. Various sensors provide signals to the controller 60 for making the fog probability determination. Cabin air temperature sensor 70 provides passenger compartment temperature information. Dew point or humidity sensor 72 provides the controller 60 with cabin air humidity information. Blower motor voltage sensor 74 is representative of blower speed and provides information representative of blower speed to the controller 60. The HVAC discharge air sensor 76 provides the controller 60 with the HVAC discharge temperature information.

An engine coolant temperature sensor 78 provides engine coolant temperature signals to the controller 60. The controller 60 determines whether the engine coolant temperature is at or above a predetermined engine coolant temperature level. A transmission oil temperature sensor 80 provides transmission oil temperature signals to the controller 60. The controller 60 determines whether the transmission oil temperature is at or above a predetermined transmission oil temperature level. An engine oil temperature sensor 82 provides engine oil temperature signals to the controller 60. The controller 60 can determine whether the engine oil temperature is at or above a predetermined engine oil temperature level.

An engine speed sensor 84, such as a tachometer, senses vehicle engine speed and provides engine speed signals, such as revolutions per minute, to the controller 60. An engine speed timer 86 determines the time that the engine speed is at or above a predetermined level and provides a signal representative of this time to the controller 60. A vehicle speed sensor 88, such as the vehicle speedometer, senses vehicle speed and provides vehicle speed signals to the controller 60.

An accelerator pedal sensor 90 senses accelerator pedal position and provides accelerator pedal position signals to the controller 60. A transmission gear sensor 92 senses the vehicle transmission gear which is engaged and provides transmission gear signals to the controller 60.

An HVAC evaporator sensor 94 senses the temperature of the HVAC evaporator. A blend door position sensor 96 senses the position of the blend/temperature door (not shown). A head pressure sensor 98 senses the refrigerant system head pressure, while a current sensor 99 senses the current being applied to the variable displacement compressor motor. Each sensor 94, 96, 98, and 99 provides information in the form of signals to the controller 60.

System Strategy

FIGS. 4a-d illustrate a preferred embodiment of a flow chart for a strategy 100 used by the controller 60 for overriding the fresh air mode of the air conditioning system 9. Of course, the present invention encompasses many variations and modifications of the disclosed preferred embodiment. As used in the flow chart, "TBD" means a level or an amount to be determined based on various factors, such as vehicle size and weight, engine size, final drive ratio, likely road conditions, such as flat or graded, likely climate ambient air temperatures, the engine cooling system, the likely load on the refrigerant system, etc. While the flow chart of the disclosed preferred embodiment indicates that the respective TBD levels must be met or exceeded, the present invention contemplates that ranges may be preferred for certain sensor signals. Such ranges include, for example, an amount greater than a TBD level, and amount less than a TBD level, etc.

General Conditions

Figure 4A:
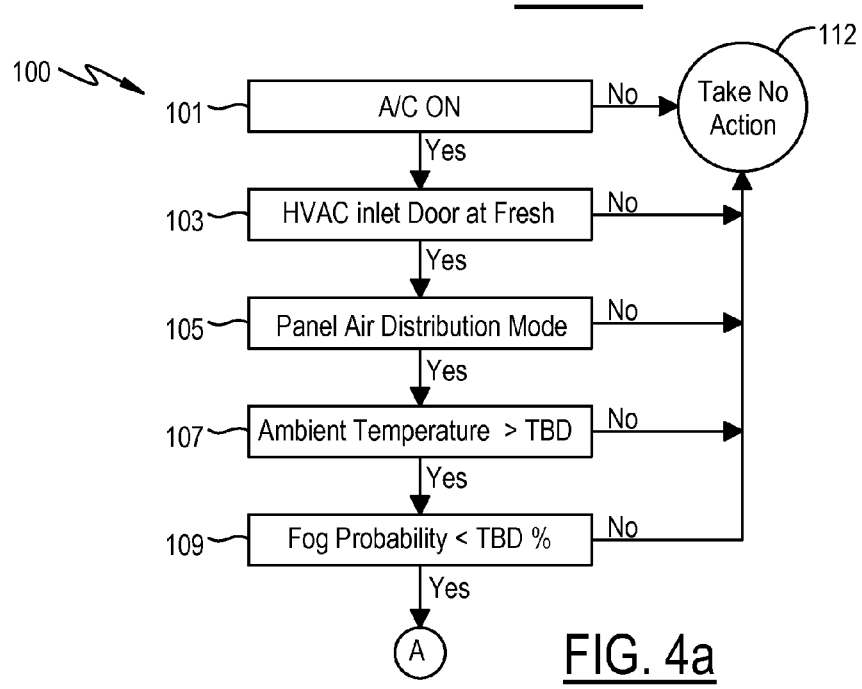
FIGS. 4a-d show a flow chart illustrating a strategy of the present invention for controlling the use of recirculating air.

FIG. 4a illustrates a series of system conditions or prerequisites that are met in the disclosed preferred embodiment before action is taken by the controller 60. The first step 101 is to determine whether the conditioning system 9 is "on." This determination is made by the controller 60 using and input signal from the system "on" sensor 62. Of course, if the system is not "on," no action is taken by the controller 60.

If the system input signal from sensor 62 indicates that the system 9 is "on," the next step 103 for the controller 60 is to determine from the input signal of inlet door position sensor 64 whether the inlet door 40 is in the fresh air mode position 48, i.e. whether the outside air inlet 42 is in communication with the air conditioner inlet 32. If the fresh air inlet 42 is not open to the conditioner inlet 32, i.e. the inlet door 40 is in the recirculation air mode position 46 in which recirculated air from the passenger compartment is being used by the conditioner 9, the controller 60 is directed to step 112 and takes no action. Step 112 does not disable the strategy but merely redirects the controller to step 101 to begin reconsidering the strategy from the beginning.

The next step 105 is for the controller 60 to determine whether the system 9 is using air distribution modes that include panel vents 20. If the signal from sensor 66 indicates that other vents are being used exclusively, such as floor vents or windshield defroster vents 24, the controller 60 will take no action. Typically, floor vents are not used unless the conditioning system 9 is providing cool air to the vehicle occupants. Also, fresh air is preferred if the system is using any windshield defrost or defog mode. This concept may also be applied to air distribution modes other than panel modes if a need arises in the future.

In step 107, the controller 60 receives an outside ambient air temperature signal from the sensor 68 and determines whether the ambient air temperature signal is above a predetermined level, in which case the controller 60 takes no action.

In step 109, the controller 60 estimates the probability of fog in the passenger compartment in the event recirculated air is used by the conditioner. If the probability estimate is at or above a predetermined level, the controller 60 takes no action. Fog probability estimation techniques are known in the art. The controller 60 determines the fog probability by using signals provided by one or more of the sensor inputs, such as from the cabin temperature sensor 70, the dew point sensor 72, the blower voltage sensor 74, the blend door position sensor 96, the discharge air temperature sensor 76, the engine coolant temperature sensor 78, and the vehicle speed sensor 88. Additional data may be used to determine fog probability, such as sunload as determined by a glass temperature sensor or a dashboard temperature sensor.

Powertrain Temperature Conditions

Figure 4B:
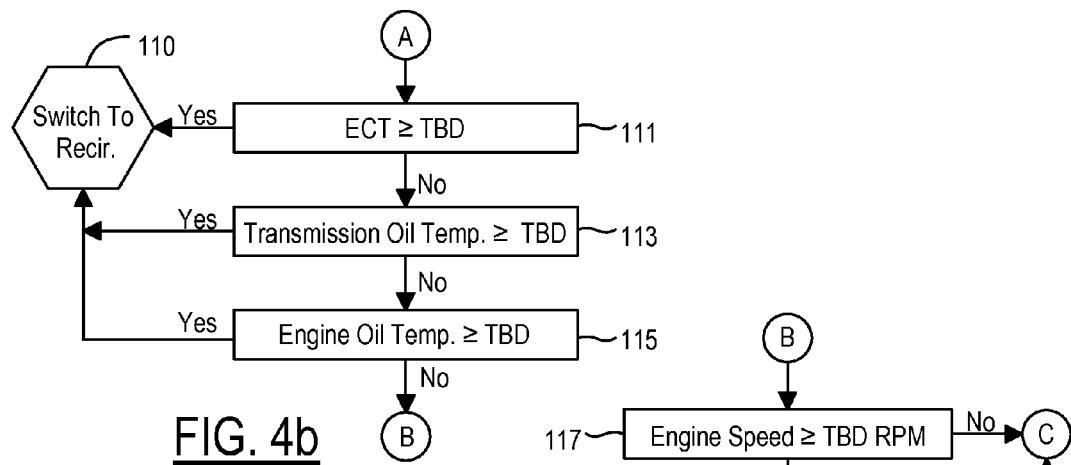

Provided that the prerequisite general conditions of FIG. 4a are met, the controller 60 next makes the determinations of steps 111, 113, and 115 of FIG. 4b. Input from the engine coolant temperature sensor 78 is used by the controller 60 to determine whether the engine coolant is at or above a predetermined temperature. Input from the transmission oil sensor 80 is used by the controller 60 to determine whether the transmission oil is at or above a predetermined temperature. Input from the engine oil temperature sensor 82 is used by the controller 60 to determine whether the engine oil is at or above a predetermined temperature.

If any of the temperatures provided by data from sensors 78, 80 or 82 is at or above its respective predetermined temperature, the controller 60 takes step 110 to electronically override the system controls 12 to switch the system from a fresh air mode to the recirculated air mode by moving the inlet door 40 from the position 48, in which the conditioner inlet 32 is open to the fresh air inlet 42, to the position 46 in which the conditioner inlet 32 is open to passenger compartment inlet 44 so that air is recirculated. In addition to optimizing the HVAC system 9, the Powertrain Conditions strategy also alleviates powertrain cooling problems during high load conditions, such as during a trailer tow or under high loads caused by long road grades, without the need to reduce engine power under certain conditions.

Driving Conditions

Figure 4C:
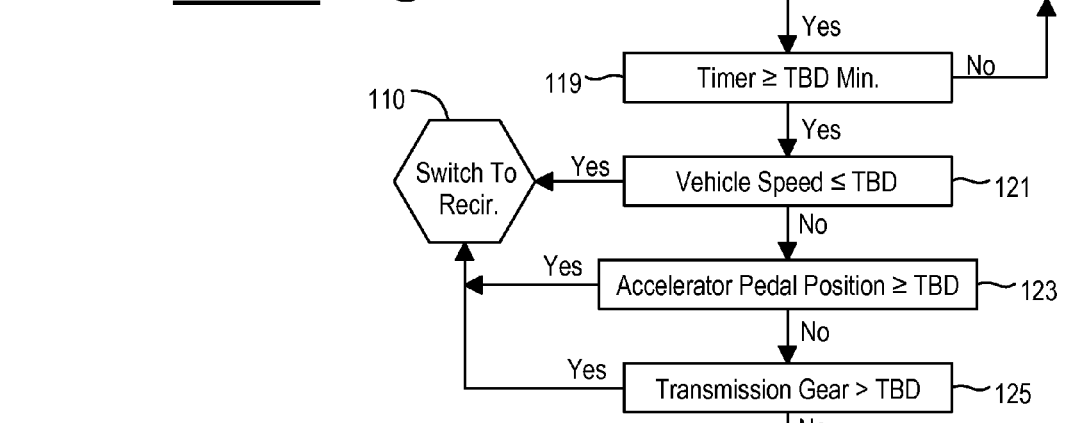

If none of the steps 111, 113 or 115 of FIG. 4b result in the controller 60 overriding the system controls 12 to move the inlet door 40 to the recirculating mode position 46, step 117 of FIG. 4c is then taken. Input from the engine speed sensor 84 is used by the controller 60 to determine whether the engine speed is at or above a predetermined engine speed level. If the engine speed is at or above the predetermined level, the controller 60 next considers input from sensor 86 to determine whether the engine speed has been at or above the predetermined engine speed level for at least a predetermined time. By considering the time in which the engine speed is at or above the predetermined engine speed level, the controller 60 may assure that the engine speed has not been increased due to a short term acceleration of the vehicle. The controller 60 delays action until the sensor 86 indicates that the engine speed is at or above a predetermined engine speed for a predetermined time, such as 30 seconds.

If the engine speed has been at or above the predetermined engine speed level for at least the predetermined time, the controller 60 next considers steps 121, 123, and 125. In step 121, input from the vehicle speed sensor 88 is used by the controller 60 to determine whether the vehicle speed is at or below a predetermined vehicle speed level. In step 123, input from the accelerator pedal position sensor 90 is used to determine whether the accelerator pedal position is at or above a predetermined accelerator pedal position level, which may be a pedal angle or a certain percentage of the full range of accelerator pedal pivoting. In step 125, the transmission gear sensor 92 provides input the controller 60 as to the transmission gear engaged and the controller 60 determines whether the transmission gear engaged is above a predetermined transmission gear level. If the controller 60 determines that any of the conditions of steps 121, 123, or 125 are met, the controller 60 takes step 110 to override the system controls 12 and switch the conditioner to the recirculation mode as previously described.

Climate Control Conditions

Figure 4D:
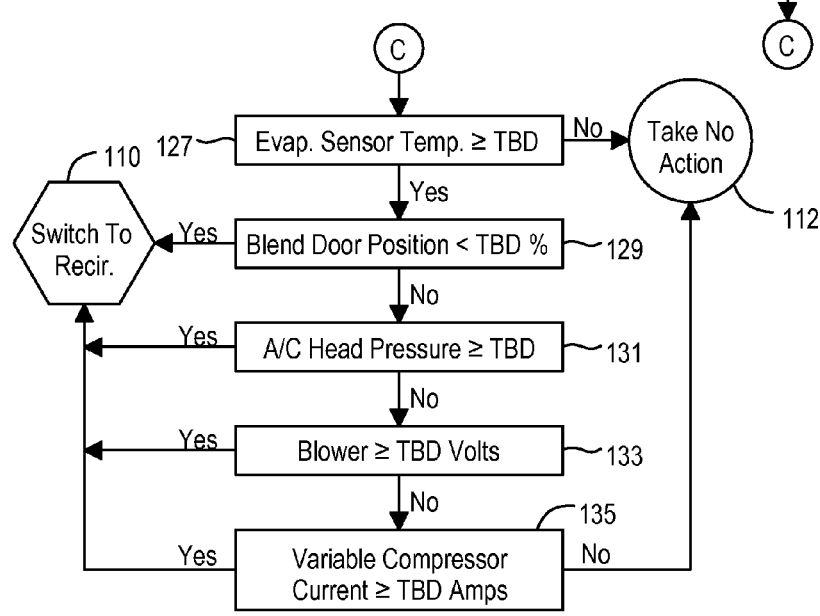

If the engine speed level of step 117 is below the predetermined engine speed level, or if the engine speed has not been at or above the predetermined engine speed level for the predetermined time or greater as determined in step 119, the next step taken is 127 of FIG. 4d. In step 127, input from the HVAC evaporator temperature sensor 94 is used by the controller 60 to determine whether the evaporator temperature is at or above a predetermined evaporator temperature level. If not, the controller 60 is directed to step 112 and takes no action to override the system controls 12. The controller 60 merely recycles to step 101 to continuously check whether any of the system logic parameters have been met, as previously described.

If step 127 results in the controller 60 determining that the evaporator temperature is above the predetermined evaporator temperature level, the controller 60 then considers the factors of steps 129, 131, 133 and 135 to determine whether the system controls 12 should be overridden to switch the conditioner 9 to the recirculation mode. In step 129, the controller 60 uses input from the blend door position sensor 96 to determine whether the blend door position is below a predetermined blend door level. The predetermined blend door level can be a position of the blend door as a percentage of the extent it is moved from the full "cool" position the full "heat" position. If the blend door position is below a predetermined blend door level, the controller 60 will override the system controls 12 to move the conditioner 9 to the recirculation mode as previously described.

In step 131, the controller 60 uses input from the HVAC head pressure sensor 98 to determine whether the refrigerant discharge pressure is at or above a predetermined head pressure level. In step 133, the controller 60 uses input from the blower speed sensor 74 to determine whether the blower speed is at or above a predetermined blower speed level. In step 135, the controller 60 uses input from the compressor current sensor 99 to determine whether the compressor current is at or above a predetermined compressor current level. If the controller 60 determines that any of the inputs from steps 131, 133, or 135 is at or above its respective predetermined level, the controller 60 takes step 110 to override the system controls 12 and switch the conditioner 9 to the recirculation mode, as previously described.

If none of the steps 129, 131, 133, and 135 result in the controller 60 switching the system to recirculation mode, the controller 60 is directed to step 112 and takes no action but to reconsider the system logic beginning at step 101.

The software of the controller 60 includes a built in hysteresis to prevent the inlet door 40 from "hunting" or moving continuously. For each predetermined level referenced herein which the controller 60 uses to determine whether action should be taken, there is a hysteresis value which must be reached before the controller 60 changes the decision, as is well known in the art. For example, if a predetermined level of engine coolant temperature of 100 degrees centigrade is reached, and the controller 60 switches the system 9 to the recirculation mode, the controller software may allow the temperature to drop below the predetermined temperature, for example, to 95 degrees centigrade, before the system 9 is switched back to the fresh mode.

In summary, the controller 60 will override the fresh air inlet mode and switch the input of the system 9 to a recirculation mode in the event that certain General conditions or prerequisites are met, and one of the Powertrain Temperature, Driving, or Climate Control conditions are met.

While a preferred embodiment of the invention has been described in detail, those familiar with the art to which this invention relates will recognize various alternative designs and embodiments for practicing the invention as defined by the following claims.

What is claimed is:

1. An air handling system for a vehicle, the vehicle having a passenger compartment, the system comprising:
    a conditioner for treating air, the conditioner having an inlet selectively opening to a source of air from (a) within the passenger compartment and (b) outside of the passenger compartment,
    a controller for selecting the source of inlet air open to the conditioner,
    a sensor for sensing a signal representative of vehicle engine oil temperature and for communicating the vehicle engine oil temperature signal to the controller,
    wherein the controller selects inlet air open to the conditioner from within the passenger compartment when the vehicle engine oil temperature signal is within a first predetermined vehicle engine oil temperature signal range.

2. The air handling system as defined in claim 1 further comprising a sensor for sensing a condition indicative of the probability of fog in the passenger compartment if the source of air to the conditioner is air within the passenger compartment and for communicating the probably of fog to the controller, wherein the controller selects inlet air open to the conditioner from within the passenger compartment when the vehicle engine oil temperature signal is within the first predetermined vehicle engine oil temperature signal range and when the probability of fog in the passenger compartment is below a predetermined level.

3. The air handling system as defined in claim 2 comprising a sensor for sensing a signal representative of vehicle transmission oil temperature and for communicating the transmission oil temperature signal to the controller, wherein the controller selects inlet air open to the conditioner from within the passenger compartment when (i) the transmission oil temperature signal is within a first predetermined transmission oil temperature signal range, and (ii) the vehicle engine oil temperature signal is within a second predetermined vehicle engine oil temperature signal range.

4. The air handling system as defined in claim 3 further comprising a sensor for sensing a signal representative of the engine coolant temperature and for communicating the engine coolant temperature signal to the controller, wherein the controller selects inlet air open to the conditioner from within the passenger compartment when (i) the transmission oil temperature signal is within a (second) predetermined transmission oil temperature signal range, (ii) the vehicle engine oil temperature signal is within the second predetermined vehicle engine oil temperature signal range, or (iii) the engine coolant temperature signal is within a predetermined engine coolant temperature signal range.

5. An air handling system for a vehicle, the vehicle having a passenger compartment, the system comprising:
    a conditioner for treating air, the conditioner having an inlet selectively opening to a source of air from (a) within the passenger compartment and (b) outside of the passenger compartment,
    a controller for selecting the source of inlet air open to the conditioner,
    a sensor for sensing a signal representative of vehicle engine speed and for communicating the vehicle engine speed signal to the controller,
    wherein the controller selects inlet air open to the conditioner from within the passenger compartment when the vehicle engine speed signal is within a predetermined vehicle engine speed signal range.

6. The air handling system as defined in claim 5 further comprising a timer for sensing a time signal representative of the time in which the vehicle engine speed signal is within a predetermined vehicle engine speed signal range and communicating the time signal in which the vehicle engine speed signal is within the predetermined vehicle speed signal range to the controller, wherein the controller selects inlet air open to the conditioner from within the passenger compartment the vehicle engine speed signal is within the predetermined vehicle engine speed range and the time signal in which the vehicle engine speed signal is within the predetermined vehicle speed signal range is within a predetermined time signal range.

7. The air handling system as defined in claim 5 further comprising a sensor for determining a signal representative of vehicle accelerator pedal position and for communicating the vehicle accelerator position signal to the controller, wherein the controller selects inlet air open to the conditioner from within the passenger compartment the vehicle engine speed signal is within the predetermined vehicle engine speed range and the accelerator pedal position signal is within the predetermined accelerator position signal range.

8. The air handling system as defined in claim 5 further comprising a sensor for sensing a signal representative of the vehicle transmission gear engaged and for communicating the transmission gear engaged signal to the controller, wherein the controller selects inlet air open to the conditioner from within the passenger compartment when the vehicle engine speed signal is within the predetermined vehicle engine speed range and the transmission gear signal is within a predetermined transmission gear signal range.

9. The air handling system as defined in claim 5 further comprising a sensor for sensing a signal representative of vehicle speed and for communicating the vehicle speed signal to the controller, wherein the controller selects inlet air open to the conditioner from within the passenger compartment when the vehicle engine speed signal is within the predetermined vehicle engine speed signal range and the vehicle speed signal is within a predetermined vehicle speed signal range.

10. The air handling system as defined in claim 5 further comprising a timer for sensing a time signal representative of the time in which the vehicle engine speed signal is within a predetermined vehicle engine speed signal range and communicating the time signal in which the vehicle engine speed signal is within the predetermined vehicle speed signal range to the controller and a sensor for determining a signal representative of vehicle accelerator pedal position and for communicating the vehicle accelerator position signal to the controller, wherein the controller selects inlet air open to the conditioner from within the passenger compartment when (i) the vehicle engine speed signal is within the predetermined vehicle engine speed signal range, (ii) the time signal in which the vehicle engine speed signal is within the predetermined vehicle speed signal range is within the predetermined time signal limit, and (iii) the accelerator pedal position signal is within a predetermined accelerator position signal range.

11. The air handling system as defined in claim 5 further comprising a sensor for sensing a condition indicative of the probability of fog in the passenger compartment if the source of air to the conditioner is air within the passenger compartment and for communicating the probably of fog to the controller, wherein the controller selects inlet air open to the conditioner from within the passenger compartment when the evaporator temperature signal is within a predetermined evaporator temperature signal range and when the probability of fog in the passenger compartment is below a predetermined level.

12. An air handling system for a vehicle, the vehicle having a passenger compartment, the system comprising:
    a conditioner for treating air, the conditioner having an inlet selectively opening to a source of air from (a) within the passenger compartment and (b) outside of the passenger compartment,
    a controller for selecting the source of inlet air open to the conditioner,
    a sensor for sensing a signal representative of evaporator temperature and for communicating the evaporator temperature signal to the controller,
    a sensor for sensing a condition indicative of the probability of fog in the passenger compartment if the source of air to the conditioner is air within the passenger compartment and for communicating the probably of fog to the controller,
    wherein the controller selects inlet air to the conditioner from within the passenger compartment when the evaporator temperature signal within a predetermined evaporator temperature signal range and when the probability of fog in the passenger compartment is below a predetermined level.

13. The air handling system as defined in claim 12 further comprising a sensor for sensing a signal representative of the blend door position and for communicating the blend door position signal to the controller, wherein the controller selects inlet air to the conditioner from within the passenger compartment when the evaporator temperature signal within a predetermined evaporator temperature signal range and the blend door position signal is within a predetermined blend door position signal range.

14. The air handling system as defined in claim 12 further comprising a sensor for a signal representative of the conditioner head pressure and for communicating the head pressure signal to the controller, wherein the controller selects inlet air open to the conditioner from within the passenger compartment when the evaporator temperature signal is within a predetermined evaporator temperature signal range and the head pressure signal is within a predetermined head pressure signal range.

15. The air handling system as defined in claim 12 further comprising a sensor for sensing a signal representative of the conditioner blower speed and for communicating the blower speed signal to the controller, wherein the controller selects inlet air open to the conditioner from within the passenger compartment when the evaporator temperature signal is within a predetermined evaporator temperature signal range and the blower speed signal is within a predetermined blower speed signal range.

16. The air handling system as defined in claim 12 further comprising a sensor for sensing a signal representative of the current used by the air conditioner compressor and for communicating the compressor current signal to the controller, wherein the controller selects inlet air open to the conditioner from within the passenger compartment when the evaporator temperature signal is within a predetermined evaporator temperature signal range and the compressor current signal is within a predetermined compressor current signal range.

17. The air handling system as defined in claim 12 further comprising a sensor for sensing ambient air temperature and for communicating the ambient air temperature to the controller, wherein the controller selects inlet air open to the conditioner from within the passenger compartment when the ambient temperature is above an ambient temperature predetermined level.

18. A method of controlling air recirculation in an air handling system for a vehicle, comprising the steps of:
    manually selecting an air inlet mode from a fresh air mode, a recirculation mode, and an intermediate mode with both fresh and recirculated air;
    sensing a vehicle engine oil temperature; and
    overriding the manually selected inlet mode by automatically selecting recirculation mode when the engine oil temperature is above a predetermined temperature.

\* \* \* \* \*